No. 798,214. PATENTED AUG. 29, 1905.
L. A. ROBERTS.
MIXING AND KNEADING MACHINE.
APPLICATION FILED APR. 29, 1904.
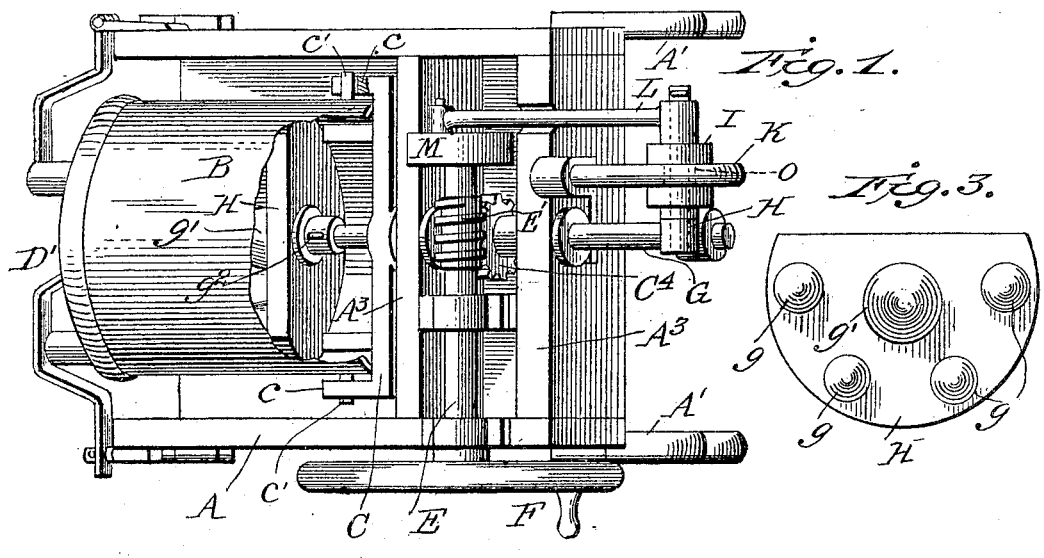
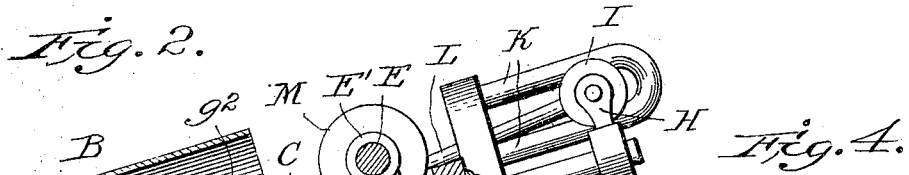
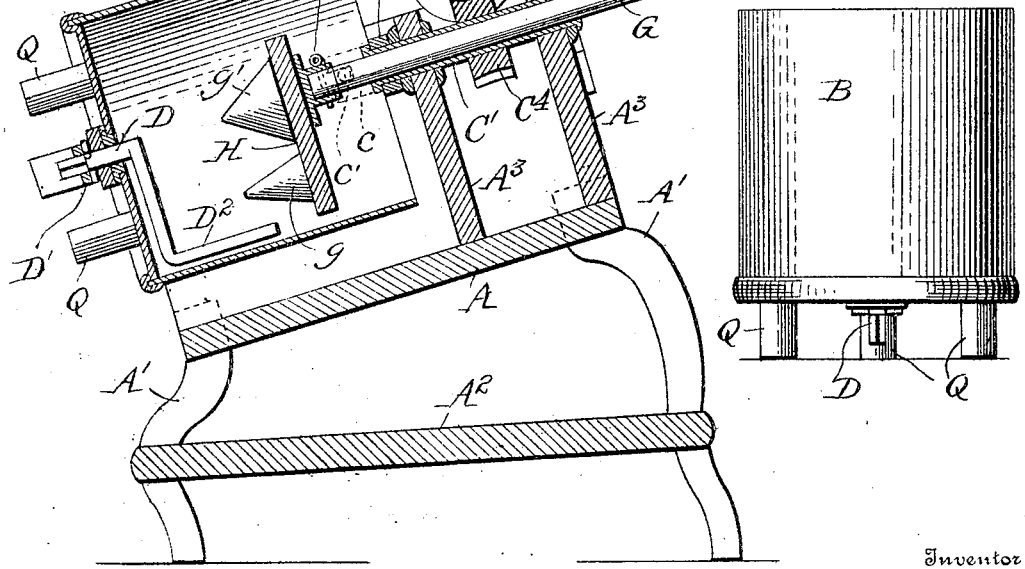
Witnesses
Edwin L. Yewell
Thomas Durant
Inventor
Lewis A. Roberts
By Church & Church
his Attorneys

UNITED STATES PATENT OFFICE.

LEWIS A. ROBERTS, OF CARBONDALE, PENNSYLVANIA.

MIXING AND KNEADING MACHINE.

No. 798,214.  Specification of Letters Patent.  Patented Aug. 29, 1905.

Application filed April 29, 1904. Serial No. 205,530.

*To all whom it may concern:*

Be it known that I, LEWIS A. ROBERTS, of Carbondale, county of Lackawanna, State of Pennsylvania, have invented certain new and useful Improvements in Mixing and Kneading Machines; and I do hereby declare the following to be a full, clear, and exact description of the same, reference being had to the accompanying drawings, forming a part of this specification, and to the letters of reference thereon.

The present invention relates to improvements in machinery designed for mixing and kneading dough or batter for bread and cake making, &c., the objects of the invention being to simplify the construction and provide a machine which will as far as possible simulate or produce the effect of hand-kneading, to which ends the invention consists in certain novel details of construction and combinations and arrangements of parts, all as will be now described, and particularly pointed out in the appended claims.

Referring to the accompanying drawings, Figure 1 is a plan view of a machine embodying the present improvements, portions being broken away to disclose underlying parts. Fig. 2 is a vertical section taken centrally of the machine with some of the parts in elevation. Fig. 3 is a detail elevation of the kneader-head. Fig. 4 is an elevation of the dough-receptacle removed from the machine.

Like letters of reference in the several figures indicate the same parts.

In its general characteristics the machine adopted for illustrating the present improvements resembles the machine illustrated in my prior application, Serial No. 163,390, which resulted in a patent issued to me on March 29, 1904, and as in said prior machine the working parts of the device are mounted in a suitable boxing or framework A of any desired material of rectangular form and mounted in an inclined position on a base formed by legs A', braced by a shelf or frame $A^2$, as shown.

The receptacle B, in which the dough or batter is placed, is preferably cylindrical, open at one end, and is adapted to be mounted in the frame in an inclined position and so as to be capable of a rotary movement, which is imparted thereto by a rotating head C, having slotted arms $c$ embracing the open end of the receptacle and adapted to coöperate with lugs or projections $c'$ thereon. The opposite or closed end of the receptacle is supported, preferably, by a scraper-shaft D, journaled in the lower end of the receptacle and having a squared end adapted to fit into a seat in the cross-bar D', which may be swung into or out of position, so as to hold the receptacle in place or to permit of its ready removal. The scraper-shaft carries on its inner end a scraper $D^2$, which remaining in fixed position during the rotation of the cylinder will prevent the adhesion of the dough to said cylinder and also stretch and pull the dough to allow the air to enter and assist in the process of fermentation, as will be readily understood.

The rotary head before referred to is preferably mounted on a sleeve C', journaled in bearings in the frame, such bearings being preferably formed in cross-pieces $A^3$, and it is provided with a worm-gear $C^4$, preferably located intermediate said cross-pieces.

A power-shaft E is journaled in bearings arranged transversely of the frame and provided with a worm E', meshing with the worm-wheel and whereby on the rotation of said shaft either by hand or power the head and receptacle will be given a slow but powerful rotary movement. For convenience the power-shaft is provided with a balance-wheel and crank-handle F, adapting the machine for manual operation.

Passing through the sleeve of the rotary head is a reciprocatory shaft G, carrying at one end a removable kneader-head H, the latter occupying a position within the receptacle when in place in the machine and being preferably of a segmental shape or having its upper portion cut away to permit of the free access of air to the dough within the receptacle. Upon its forward or operating face the kneader-head is provided with a series of conical or frusto-conical projections $g\ g'$, said projections being relatively large at the base and tapering down to rounded ends of relatively small diameter. The central projection $g'$ is of relatively larger base diameter than the surrounding projections and located eccentrically to or below the axial line of the receptacle, so as to act more favorably on the dough during the rotation of the receptacle. The form of these kneading projections is such that the dough does not readily adhere thereto, and at the same time in the kneading operation the tendency of said projections is to constantly force the dough toward the bottom of the receptacle and thoroughly knead and mix the same. The kneader-head is usually mounted on the end of the reciprocatory shaft and removably attached thereto by a transverse pin, such as is shown at $g^2$.

At its outer end the reciprocatory shaft is adjustably connected by an arm H with a cross-head I, working in fixed guides K on the machine-frame, and reciprocatory motion is imparted thereto by means of a connecting-rod L, extending forwardly and coöperating with a crank M on the end of the power-shaft before referred to. The cross-head may be provided with a roller O for coöperation with the guideways on the frame in order to reduce so far as possible friction between the stationary and moving parts. It will be noted that the crank is brought as close as possible into alinement with the reciprocatory shaft in order to reduce the transverse pressure tending to distort the parts when resistance is offered to the reciprocation of the kneader-head.

The receptacle for the dough is provided with feet or extensions Q, upon which it may rest when removed from the machine and is in upright position.

In operation dough of the proper consistency or the ingredients from which the dough is to be made are placed in the receptacle before the latter is put in the machine. After being placed in the receptacle the receptacle containing the ingredients is placed in the machine in the manner before indicated and rotation imparted to the power-shaft. This rotation of the power-shaft rotates the receptacle and simultaneously imparts a reciprocatory movement to the kneader-head, the combined operation serving to thoroughly mix and knead the dough in a manner closely simulating and producing practically the same effect as hand-kneading. When the kneading operation is completed, the receptacle, with the kneaded dough, is removed from the machine and the dough subsequently treated in accordance with the requirements of the bread or pastry being made.

Obviously receptacles of different size may be provided for each machine, and in order to accommodate such receptacles the rotary head may be provided with a series of slotted or notched arms $c$, as shown clearly in Fig. 1, and it is also obvious that kneader-heads of the various sizes required for the different sized receptacles may be provided and substituted one for the other as required.

Having thus described my invention, what I claim as new, and desire to secure by Letters Patent, is—

1. In a machine such as described, the combination with the receptacle journaled to rotate on an inclined axis, a sleeve constituting one of the journals of said receptacle, a worm-gear mounted on said sleeve, a power-shaft and a worm on said shaft meshing with the worm-gear, of a reciprocatory shaft passing through said sleeve, a kneader-head on one end of said shaft, a crank on the drive-shaft and connections between said crank and reciprocatory shaft for reciprocating the kneader-head, a scraping-shaft passing through the bottom of the receptacle and constituting the other journal upon which the receptacle rotates and a support for holding said scraper against rotation; substantially as described.

2. In a dough-kneading machine, the combination with the receptacle closed at one end and open at the other journaled to rotate on an inclined axis, a scraper-shaft passing through the closed end of said receptacle and constituting one of the journals upon which the receptacle rotates, of a support for holding said scraper-shaft against rotation, means for rotating the receptacle, a reciprocatory kneader-head working in the receptacle and means for reciprocating said head; substantially as described.

3. In a dough-kneading machine, the combination of the receptacle removably mounted in the machine to rotate on an inclined axis, a rotary head coöperating with one end of said receptacle, a scraper-shaft journaled in the opposite end of said receptacle and having a squared outer end, a scraper on the inner end of said shaft, a movable cross-piece mounted on the machine-frame and having an aperture for the reception of the squared end of the scraper-shaft, a reciprocatory kneader-head and means for simultaneously reciprocating said head and rotating the receptacle; substantially as described.

LEWIS A. ROBERTS.

Witnesses:
MARGARET L. RUANE,
HERMAN OILHAUS.